Feb. 11, 1969 E. D. DUDA 3,426,588
DIFFERENTIAL FLUX CURRENT TRANSDUCER
Filed Nov. 3, 1966 Sheet 1 of 2

INVENTOR.
EDWARD D. DUDA
BY
OSTROLENK, FABER, GERB & SOFFEN
ATTORNEYS

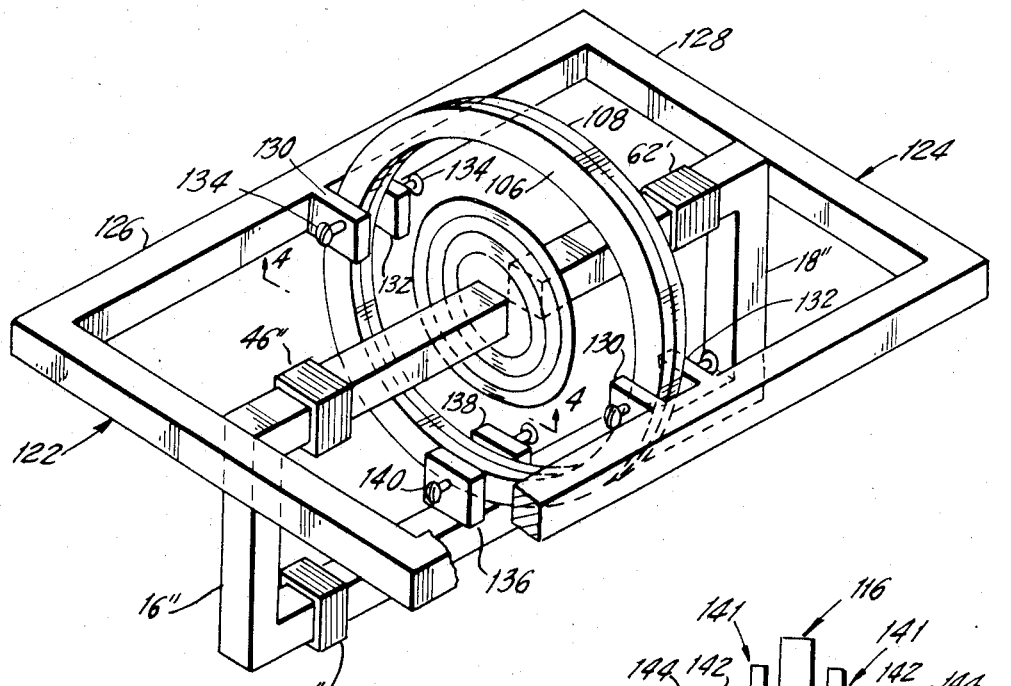
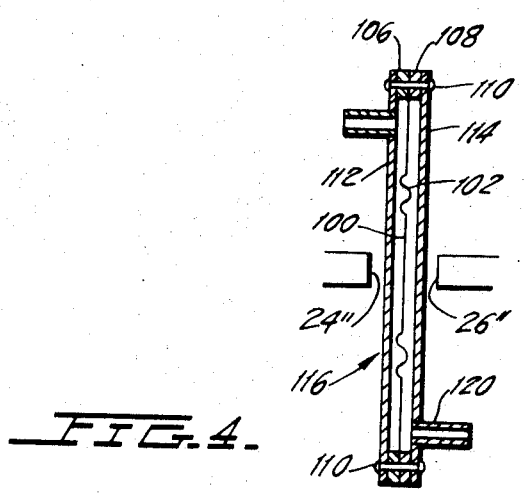

United States Patent Office 3,426,588
Patented Feb. 11, 1969

3,426,588
DIFFERENTIAL FLUX CURRENT TRANSDUCER
Edward D. Duda, 1709 Wrightfield Ave.,
Yardley, Pa. 19067
Filed Nov. 3, 1966, Ser. No. 591,845
U.S. Cl. 73—141
Int. Cl. G01l 5/00
19 Claims

ABSTRACT OF THE DISCLOSURE

The invention is broadly concerned with producing an electrical current signal, the magnitude of which is dependent upon the physical displacement of a force-responsive sensing member. Specifically the invention provides that the sensing member be a common portion of two magnetic circuit paths with each magnetic circuit path including an air gap, the length of which is dependent upon the position of the sensing member. Deflection of the sensing member increases the air gap in one magnetic path and decreases the air gap in the other magnetic path whereby the magnetic reluctances of such paths are proportionately changed. Thus, by inductively coupling two voltage sources to the magnetic paths, the magnetization currents produced thereby will vary in accordance with the reluctance of the associated magnetic path. It is the measurement of such magnetization currents which provides the indication of the displacement of the sensing member.

---

This invention relates to transducer devices, and more particularly relates to a differential flux current transducer which produces as an output an electrical current the magnitude of which is proportional to the physical displacement of a force-responsive portion thereof.

Without attempting to cover all possible applications of all transducers, one can appreciate that a measuring device which can transform pressure, acceleration, force, linear motion, or any other variable that causes a linear or rotary motion into a proportional electrical current has many uses.

In the prior art there are known variable reluctance devices used for such purposes. However, in the prior art devices, the output signal is in the form of an alternating voltage originating from a change in inductance in a pair of coils. These variable inductance coils are generally elements of a bridged circuit and require high impedance voltage instruments to sense the output voltage signal. It is apparent that a low impedance measuring instrument would be incompatible with these devices since it would shunt current from one side of the bridge to the other and would also overburden or overload the coils and negate their function.

In contradistinction to the prior art, the instant invention provides a transducer which produces a current output proportional to the magnitude of physical displacement measured. The current output is directly suitable for use with low impedance measuring instruments and with process control instruments which operate directly on a current signal.

Specifically, and in its preferred embodiment, the instant invention includes a pair of magnetic circuit paths having a displaceable magnetic sensing member in common with both paths such that displacement of the sensing member relative to a null position, simultaneously increases and decreases the magnetic reluctance of each of the magnetic circuit paths by simultaneously increasing and decreasing air gaps in the circuit paths defined on the opposite sides of the sensing member. By inductively coupling two electrical circuits to the two magnetic circuits and applying equal voltages therein, magnetization currents are generated, the magnitudes of which will necessarily be dependent upon the magnetic reluctances of the associated magnetic paths. Thus, movement of the sensing member in one direction will increase the current in one of the electrical circuit paths with a corresponding decrease in the current in the other of the electrical circuit paths whereby if such currents are combined, the net result will indicate the magnitude and displacement of the sensing member.

As a particularly advantageous feature of the instant invention, there is achieved a degree of sensitivity, that is, ratio of output signal to displacement of the sensing member which is far superior to anything existing in the prior art. The increased sensitivity may be attributed to several factors.

Specifically, and in accordance with the teachings of the instant invention, the aforementioned electrical circuit paths are so arranged relative to their associated magnetic paths that magnetic flux in the magnetic circuit paths flows in equal and in opposite directions through the common displaceable sensing member. Thus, the net magnetic flux in the common sensing member will be zero and consequently the magnetization currents can be made large without creating magnetic forces of attraction on the sensing member. These large magnetization currents will produce a proportionately larger differential output current which thereby increases the sensitivity of the instrument.

Secondly, and related to the fact that there is no magnetic flux in the common sensing member, it will be appreciated that because the sensing member does not have to resist magnetic forces of attraction, the sensing member of the instant invention can be ultra thin, light, flexible and thereby especially sensitive to the physical forces to which it is made responsive.

Third, and in accordance with the instant invention, the magnetic material for the sensing member and the magnetic circuit paths are chosen such that their magnetic reluctance is almost negligible relative to the magnetic reluctance of the air gaps. Thus, a very small change in the air gap will have a very large effect on the total magnetic circuit, which, in turn, alters the current in the inductively coupled electrical circuit paths.

Furthermore, it will be appreciated that because the common sensing member serves as a common path for both magnetic circuit paths of the invention, displacement toward one magnetic path will create an equal but opposite effect on the other magnetic circuit path. With the inductively coupled electrical circuits connected so that they subtract one magnetizing current from the other, the net result is a proportionally large output signal.

As another advantageous feature of the instant invention, there is provided a demodulating circuit of extremely low impedance, which converts the magnetizing currents into oppositely directed DC signals which may be directly applied to low impedance measuring devices.

As a further feature, there is provided an embodiment in which the sensing member is a relatively flat, corrugated diaphragm sandwiched between a pair of rings made of high-permeability ferromagnetic material which serve to collect the differential flux flowing within the sensing member. The rings cooperate with an auxiliary magnetic return path and returns any differential flux to the magnetic paths of the transducer. This arrangement in effect increases the available area for differential flux flow through the sensing member thereby preventing magnetic saturation thereof.

Accordingly it is an object of the instant invention to provide a transducer which produces a current output signal the magnitude of which is proportional to the physical displacement of a force-responsive sensing member.

Another object of the instant invention is to provide such a transducer which includes a pair of magnetic circuit paths having a displaceable sensing member in common therewith.

Another object of the instant invention is to provide such a transducer which includes a pair of inductively coupled electrical circuit paths coupled to such magnetic circuit paths in such a manner that flux generated within said magnetic circuit paths will flow in opposite directions through such displaceable sensing member.

Another object of the instant invention is to provide such a transducer in which the aforementioned electrical circuit paths include voltage source means for creating magnetization currents, the magnitudes of which are dependent upon the magnetic reluctance of their respective magnetic paths whereby changes in reluctance of said magnetic path caused by movements of said common displaceable sensing means will proportionately vary the aforementioned magnetization currents to provide an indication of the magnitude of displacement of the common sensing member.

Another object of the instant invention is to provide such a transducer wherein the use of a displaceable magnetic sensing member, in common with both magnetic circuit paths thereof, makes possible the condition of zero magnetic flux flowing through the magnetic sensing member whereby such magnetic sensing member will not be subject to magnetic forces of attraction.

It is another object of the instant invention to provide such a transducer wherein the displaceable sensing member thereof is thin, flexible, and thereby easily deflected by forces to which it is responsive.

Still another object of the instant invention is to provide such a transducer which includes demodulating means for converting magnetization currents produced thereby into DC signals which can be combined and utilized directly in low impedance current sensing instruments.

Yet another object of the instant invention is to provide such a transducer which includes magnetic shunt return paths for permitting the sensing member thereof to carry larger values of flux without itself becoming magnetically saturated.

These and other objects of the instant invention may be had by referring to the following description and drawings, in which:

FIGURE 3 shows an alternative embodiment of the invention of FIGURE 1;

FIGURE 4 is a view taken along the arrows 4—4 of FIGURE 3; and

FIGURE 5 is a plan view showing a possible alternative embodiment for a portion of the device shown in FIGURE 3.

Figures 1, 1A:
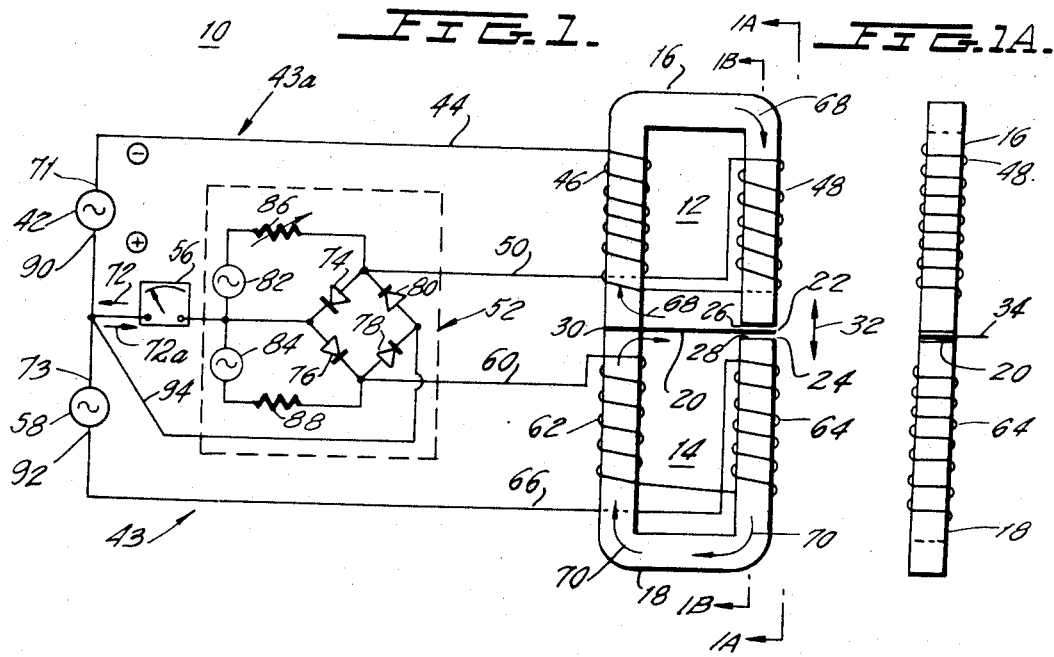
FIGURE 1 is a schematic diagram illustrating the principles of the instant invention.
FIGURE 1A is a view taken along the arrows 1A—1A of FIGURE 1 illustrating a possible application of the invention of FIGURE 1.

Referring to FIGURE 1, there is shown a transducer 10 of the instant invention which includes first and second magnetic paths, generally indicated at 12 and 14, each defined by a generally U-shaped core 16 and 18, respectively, of magnetic material and a displaceable sensing member 20 which is common to both magnetic paths 12 and 14. The core sections 16 and 18 are made of ferromagnetic material in any convenient form. Thus, although in the preferred embodiment such core sections are composed of wound magnetic strip iron, they may be laminations, powdered iron or of any suitable construction. Similarly, it is to be understood that the U-shaped configurations of cores 16 and 18 represent only one of a multitude of possible shapes for such cores.

In accordance with the instant invention, the ferromagnetic material of the core sections 16 and 18 is so chosen that the magnetic reluctance of the core is substantially less than the reluctance of the air gaps 22 and 24 formed between the displaceable sensing member 20 and the pole faces 26 and 28 of the core members 16 and 18, respectively. Thus, and in accordance with a preferred embodiment of the instant invention, the core material is so chosen that its magnetic reluctance is less than 2% of the reluctance of the air gaps 22 and 24 such that it may be said that the total reluctance for the magnetic circuit paths 12 and 14, respectively, is for all practical purposes dependent upon the reluctance of the air gaps 22 and 24.

The cores 16 and 18 can be an integral unit or made up of symmetrical half sections appropriately joined at 30. The integral core is preferred since it eliminates any air gaps at a point such as 30.

The sensing member 20 is similarly made of ferromagnetic material of high permeability magnetic steel such that it will have little influence on the reluctance of the two circuit paths 12 and 14 with which it is in common. As schematically shown in FIGURE 1, the sensing member 20 is displaceable in opposite directions indicated by the arrow 32 in response to external forces being applied thereto to vary the lengths of the air gaps 26 and 28. Thus it will be appreciated that if the sensing member 20 should be displaced toward pole face 26, for example, then air gap 22 would decrease and air gap 24 would increase whereby the reluctance of circuit path 12 would decrease while the reluctance of circuit path 14 would increase.

Figure 1B:
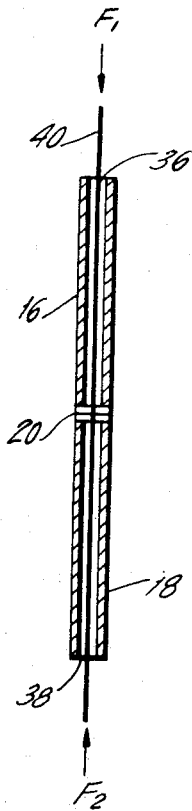
FIGURE 1B illustrates another possible application of the invention of FIGURE 1.

FIGURES 1A and 1B illustrate two possible techniques in which the sensing member 20 could be displaced in response to the application of external forces. Thus in FIGURE 1A a stylus 34 is attached to the sensing member 20. Thus it will be appreciated that stylus 34 may ride the groove of a phonographic record and, as will be further explained in greater detail, produce electrical signals proportional to the displacement of the stylus 34.

In FIGURE 1B an alternative embodiment is provided wherein the core sections 16 and 18 include aligned passageways 36 and 38 through which a rod 40 may pass. The rod 40 is suitably secured to the sensing member 20 whereby application of forces F1 or F2 would cause corresponding displacement of the sensing member 20.

The embodiments of FIGURES 1A and 1B are for exemplary purposes only and in no way is the invention to be limited thereto. It will be appreciated that a multitude of systems might be provided to displace the sensing member 20 in response to any force of which measurement is desired. Regardless of what system is utilized, however, it will be appreciated that in the absence of external forces, the sensing member 20 occupies a null position which is equi-spaced between the pole faces 26 and 28 of the cores 16 and 18 such that the air gaps 22 and 24, and hence the reluctances of the first and second circuit paths 12 and 14, respectively, are for all practical purposes equal.

Returning to FIGURE 1, it will be seen that first and second electrical paths, generally designated 43a and 43, respectively, are inductively coupled to the first and second magnetic paths 12 and 14, respectively. Thus the first electrical circuit path 43a includes an alternating current voltage source 42, conductor 44, winding 46, winding 48, conductor 50, a demodulating circuit broadly designated 52, an indicating meter 56, and back to the voltage source 42.

The second circuit path 43 includes alternating voltage source 58, measuring device 56, demodulating circuit 52, conductor 60, winding 62, winding 64, conductor 66, and back to the alternating voltage source 58.

The windings 46 and 48 are wound in the same direction and connected in series so that when current, designated magnetization current, is passed through electrical circuit path 43a the flux path in the magnetic circuit 12 will be in the direction indicated by arrows 68 in core 16. Windings 62 and 64 of the second magnetic path 14 are similarly wound in the same direction and connected in electrical series so that with magnetization current in path 43 magnetic flux through the magnetic path 14 will be in the direction indicated by arrows 70 in core 18. If desired, the direction of windings 46, 48, 62 and 64 could be reversed, the only essential characteristic being that the flux generated by such windings be in a direction such that they would be additive if not for the presence of sensing member 20 of high permeability magnetic material.

It will be appreciated, however, that with the presence of sensing member 20 in common to the two magnetic paths 12 and 14, the flux in each will be as follows. The flux in magnetic path 12 will follow the direction of arrows 68 and flow through core 16, gap 22, sensing member 20 and back to core 16.

Likewise flux in magnetic circuit 14 flows in the direction of arrows 70 through core 18, sensing member 20, air gap 24 and back to core 18. It will be appreciated, and in accordance with the instant invention, that since the flux from each magnetic circuit path 12 and 14 flows in opposite directions through sensing member 20, then assuming (1) that voltage sources 42 and 58 are equal so that their associated magnetization currents are equal, (2) the cores 16 and 18 are perfectly symmetrical, and (3) the sensing member 20 is in its null position intermediate the faces 26 and 28; then the flux flowing in magnetic circuit paths 12 and 14 will be equal such that the net flux flowing through sensing member 20 will be zero.

It is an important advantage in the instant invention that the net flux through the sensing member 20 be zero in the case where the sensing member occupies its null position and, as will be explained in greater detail, even during deflection in either direction. Specifically since there is a net magnetic flux of zero in the sensing member 20, the previously mentioned magnetization currents flowing through circuit paths 43a and 43 can be made large without creating magnetic forces of attraction on the sensing member to either of the core faces 26 or 28. These larger magnetization currents necessarily produce a proportionately larger output current signal.

Secondly, because of the zero flux flowing through the sensing member 20, such sensing member 20 can consist of a thin, flexible sensing member which is easily deflected (thereby increasing sensitivity) whereas prior art devices require a relatively stiff sensing member in order to resist magnetic forces of attraction which occur when there is net flux flowing through the displaceable sensing member.

Electrical circuit paths 43a and 43 are excited with constant and equal alternating voltage sources 42 and 58. It is to be understood that although two distinct voltage sources have been disclosed, if desired, two voltage taps can be taken from a single source.

As noted previously, each voltage source 42 and 58 creates a current, designated a magnetization current, in its respective electrical circuit path 43a and 43 proportional to the length of the air gaps within its associated magnetic path. Thus, assuming sensing member 20 to be in its null position, such that the total reluctance of magnetic circuit paths 12 and 14 are equal, then the magnetization currents flowing in the respective electrical circuit paths 43a and 43 would be equal. That is, with the reluctance opposing current flow in each electrical circuit path being equal, then the magnitudes of current in each electrical circuit path necessary to overcome such reluctance would be equal.

Thus, assuming terminal 71 of source 42 is positive, current would flow from source 42 through windings 46 and 48, through conductor 50, through the demodulating circuit 52, to be further described, and the measuring meter 56 in the direction designated by arrow 72. Similarly, with terminal 73 of voltage source 58 positive, current flow is in the direction of arrow 72a through measuring meter 56, demodulating circuit 52, conductor 60, windings 62 and 64, and back through conductor 66 to the negative side of the voltage source 58. Since the reluctances in each magnetic path 12 and 14 are equal when the sensing member 20 is at its null position, then the magnitude of magnetization currents flowing in the direction of 72 and 72a are equal whereby the meter M will register zero.

This feature of having the current output signal appearing on the meter 56 equal to zero when the sensing member is in its null position is an advantage of the instant invention and is to be contrasted with prior art voltage output signal devices which have an appreciable null voltage output signal when the respective sensing member of the device is at its null position.

Assuming now that the sensing member 20 is moved by an external force in the direction of pole face 26, the following events happen. Air gap 22 is decreased whereby the reluctance of the entire magnetic circuit path 12 is significantly reduced (recall that the reluctance of the magnetic material of magnetic circuit path 12 is negligible, may be ignored compared to the reluctance of the air gap). Thus, the magnitude of magnetization current flowing in electrical circuit path 43a required to maintain the same magnetic flux flowing through magnetic circuit path 12 as when the sensing member was at its null position, is reduced. Similarly, and at the same time, air gap 24 is increased whereby the magnetic reluctance of magnetic circuit path 14 is increased such that a higher magnetization current flow through circuit path 43 is required to maintain the same flux that was previously flowing through circuit path 14 when the sensing member was in its null position. Thus, current flowing through meter 56 in the direction of arrow 72a increases while current flowing through meter 56 in the direction of arrow 72 decreases such that the direction and amount of deflection of the needle of meter 56 will be a direct indication of the direction and the magnitude of deflection of the sensing member 20.

It is an advantage of the instant invention that the final output of the meter 56 not only reflects the increase of magnetization current in one electrical circuit path such as 43, but at the same time reflects the reduction in magnetization current in the second electrical circuit path such as 43a thereby giving the largest possible output signal.

It will now be appreciated that regardles of the extent of displacement of the sensing member 20, the flux flowing in magnetic circuit paths 12 and 14 will always be equal such that the flux flowing through sensing member 20 will always be equal and in opposite directions giving a net result of zero. As noted, zero flux through sensing member 20 has distinct advantages over prior art.

To give an example of the extreme sensitivity which is capable with the instant invention, assume for a moment that with the sensing member 20 in its null position, and with air gaps 22 and 24 .01 inch, when a deflection of the sensing member, say .001 inch, will increase the air gap length in one magnetic circuit 10% and decrease the air gap length 10% in the other. This change in gap length will affect the magnetization current flowing through circuit paths 43a and 43 in the same proportion. The actual magnitude of the magnetization current in each electrical circuit path 43a and 43 is inversely related to the square of the number of turns in the respective windings such as 46 and 48 and 62 and 64. It will be apparent, therefore, that the sensitivity of the device can be increased in two different ways, (1) by decreasing the number of turns in the respective windings of the magnetic circuit path, or (2) decreasing the air gaps.

The demodulating circuit 52 includes a ring of diodes 74, 76, 78 and 80 connected front-to-back. Diodes 74 and 76 are maintained conductive by virtue of voltages 82 and 84, respectively, which are in phase with voltage sources 42 and 58, respectively. The current output of voltage sources 82 and 84 is regulated by resistors 86 and 88, respectively. A detailed explanation of the current flow in FIGURE 1 will now be presented.

Assuming terminal 71 of source 42 positive, current flow is through conductor 44, winding 46, winding 48, conductor 50, diode 74 (maintained conductive by voltage source 82), meter 56 and back to the negative side 90 of source 42. In phase with voltage source 42 is voltage source 58. Thus, with terminal 73 thereof positive, current flows through meter 56 in direction of arrow 72a, through diode 76 (maintained conductive by source 84), conductor 60, winding 62, winding 64, conductor 66 and back to the negative terminal 92 of source 58.

When terminal 90 of voltage source 42 is positive, current flows through conductor 94, diode 80, conductor 50, (note that diode 74 is blocked by the reversed polarity of source 82) winding 48, winding 46, conductor 44 and terminal 71. Similarly, when terminal 92 of voltage source 58 is more positive than terminal 73, current flow is through conductor 66, winding 64, winding 62, conductor 60, diode 78, conductor 94, (note that diode 76 is blocked because of reverse polarity of source 84) back to terminal 73.

Thus, it is apparent that the alternating magnetization current is rectified into a pulsing D.C. current signal by the modulating circuit 52.

Figure 2:
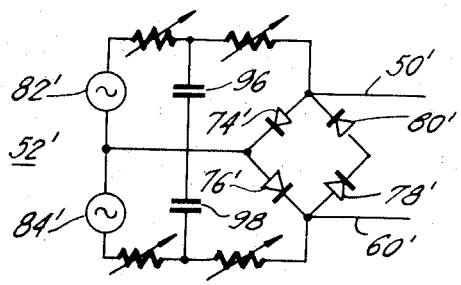
FIGURE 2 illustrates an alternative embodiment of a portion of the circuitry of FIGURE 1.

Turning to FIGURE 2, there is shown an alternative embodiment 52' of the demodulating circuit 52 of FIGURE 1 wherein, for ease of identification, corresponding elements of FIGURE 2 have been identified with a prime notation.

The demodulating circuit 52' represents an improvement over the demodulating circuit 52 of FIGURE 1 in the following manner.

Because of the inductive reactance in circuit path 43a, the magnetization current flowing therethrough lags the voltage source 42 by 90°. Thus, with the source 82 in phase with the source 42, the diode 74 will be switched on for only 90° of the 180° positive portion of the magnetization current. Similarly, in circuit path 43, since the magnetization current will lag the source 58 by 90°, with the source 84 in phase with source 58, only 90° of the 180° positive half cycle of source 58 will pass through demodulating circuit 52 and the meter 56.

In FIGURE 2, by introducing capacitors 96 and 98 into demodulating circuit 52', the ON cycle of diode 74' and 76' will lag sources 82' and 84', respectively, by 90° such that the entire 180° positive half cycle of the respective magnetization currents in circuit paths 43a and 43 will pass through the diodes 74' and 76' and the meter 56.

Turning to FIGURES 3 and 4, there is shown an embodiment of the instant invention wherein like portions have been designated with a double prime notation and wherein the sensing member 100 is in the form of a corrugated diaphragm of thin ferromagnetic material of high permeability. The diaphragm is corrugated at 102 and 104 to add flexibility and secondly, when the diaphragm is displaced relative to pole faces 24" and 26" the center portion of the diaphragm which is in the vicinity of the pole faces will remain flat and parallel to faces 24" and 26" rather than cup or skewed as would be the case without corrugation.

As can be most clearly seen in FIGURE 4, the diaphragm 100 is sandwiched between two rings 106 and 108, made of ferromagnetic material of high permeability. Suitable fastening means 110 maintain rings 106 and 108 in clamping relationship with respect to diaphragm 100 while at the same time secure outer walls 112 and 114 of the diaphragm-containing chamber 116. Walls 112 and 114 carry ports 118 and 120 such that the embodiment of FIGURE 3 would be particularly useful for producing an electrical signal on meter 56 of FIGURE 1 in response to pressure variation on opposite sides of the chamber 116.

The magnetic shunt rings 106 and 108 cause the differential flux to flow uniformly and radially outward throughout the entire sensing member 100. The rings, acting as a magnetic shunt, collect the flux from the diaphragm and return it to the core. Although in the theoretical invention there is zero flux flowing through the sensing member at all times, and theoretically zero differential flux, as a practical matter because of lack of symmetry and ohmic resistance in the coils and impedance in the demodulating circuit and of the instrument, there is a differential flux through the diaphragm 100.

The arrangement of FIGURE 3 showing flux collecting rings 106 and 108 in effect increases the available area for differential flux to flow such that the sensing member, although very thin in itself, can carry a larger magnitude of differential flux without itself becoming magnetically saturated.

The U-shaped arms in FIGURE 3 serve as the supporting structure for nulling adjustment screws. These same arms can, alternatively, be used as an additional return path for the differential flux in the shunt rings to the core 16 and 18, thereby reducing the overall reluctance of the core. When the auxiliary magnetic paths are used, only coils 46 and 62 are energized, and the U-shaped arms must be made of a ferromagnetic material.

To assure a good magnetic path from rings 106 and 108 to their respective cores 126 and 128, such cores are provided with integrally inwardly directed flanges 130 and 132 through which highly permeable screws 134 pass into pressing engagement with the respective rings 106 and 108. Similarly, the one-piece member which comprises core sections 16" and 18" includes upstanding flanges 136 and 138 through which highly magnetically permeable screws 140 pass into pressing engagement with the exterior surfaces of the rings 106 and 108. The connection between the diaphragm 100 and the core sections 16" and 18" by way of the rings 106 and 108, the screws 140 and upstanding flanges 136 corresponds to the joint of point 30 in FIGURE 1.

In FIGURE 5 is shown an alternative embodiment for connecting the rings 106 and 108 to either the core sections 16", 18" and/or the auxiliary cores 126, 128. Specifically, rather than having integrally formed flanges such as 130 and 132 in FIGURE 3, in FIGURE 5 generally L-shaped members 141 of high magnetic permeability are provided which may be secured to the respective core section in question by means of tapped members such as screws 142 of high magnetic permeability passing through elongated slots 144 in the base portions 146 of the L-shaped members 141. In this manner a higher degree of contact is provided and hence a better magnetic path is established between the rings 106, 108 and the core section in question, while at the same time the chamber 116 can be adjustably displaced laterally by simply loosening the member 142, sliding the assembly either to the left or right, and then retightening such screws.

Thus, there has been described a transducer for producing an electrical indication of the deflection of a force-responsive sensing member which has many advantages over the prior art among which, but not limited to, are current output signal; zero current output signal when the sensing member is at its null position; extremely high sensitivity which can be easily adjusted; zero flux flowing through the sensing member when it occupies its null position and for all practical purposes zero flux flowing therethrough at all times, even during deflection thereof; magnetic shunt rings for sensing member to permit for differential flux flow through the sensing member inherently due to physical configuration; simplicity; resistance to error caused by vibration due to the construction of the sensing member made possible by the instant invention; and absence of bearings, pivots, and other common sources of friction.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A transducer for converting physical displacement of a sensing member to an electrical current, the magnitude of which is proportional to the magnitude of displacement of said sensing member, said transducer comprising:
   a sensing member of magnetic material, said sensing member being displaceable from a predetermined null position in opposite directions in response to forces being applied thereto;
   first and second magnetic circuit paths, each including said sensing member as a portion thereof, and each including an air gap the lengths of which are determined by the position of said sensing member relative to its said null position, changes in the lengths of said air gaps changing the magnetic reluctance of their respective magnetic circuit paths;
   first and second electrical circuit paths inductively coupled to said first and second magnetic circuit paths, respectively, for causing magnetic flux created in each of said magnetic paths in response to current flow in each of said electrical circuit paths to flow in opposite directions through said sensing member;
   voltage source means included in said first and second electrical circuit paths for establishing first and second currents in said first and second electrical circuit paths, the magnitudes of which are dependent upon the magnetic reluctance of their respective magnetic circuit paths; and
   circuit means responsive to said first and second currents for combining said first and second currents to provide an output current proportional to the magnitude and direction of displacement of said sensing member.

2. The transducer of claim 1, wherein said circuit means includes a demodulating circuit for combining said first and second currents in subtracting relationship.

3. The transducer of claim 2, wherein said voltage source means comprises first and second alternating voltage sources of equal magnitude and said demodulating circuit is in series with both of said first and second electrical circuit paths and includes a plurality of rectifying means capable of conducting current in one direction only, first and second pairs of said rectifying means each cooperating with an auxiliary voltage source to convert said first and second currents into direct currents flowing in opposite directions.

4. The transducer of claim 3, wherein one of said first and second pairs of rectifying means is alternately permitted to vary between conducting and non-conducting states by the respective auxiliary voltage sources, and further including reactance means cooperating with each of said auxiliary voltage source means and corresponding ones of said first and second pairs of rectifying means for introducing a phase lead of the conducting state of said ones of said first and second plurality of rectifying means relative to the respective first and second alternating voltage sources; whereby said one of said first and second pairs of rectifying means will be in its conducting state for a period which corresponds to the full positive one-half cycle of the respective first and second currents generated by said first and second alternating voltage sources.

5. The transducer of claim 2, and further including measuring means responsive to said output current for providing an indication of the magnitude and direction of displacement of said sensing member.

6. The transducer of claim 1, wherein said first and second magnetic circuit paths comprise first and second core sections of ferromagnetic material and said first and second electrical circuit paths include winding portions by which said electrical circuit paths are inductively coupled to their respective core sections; said winding portions cooperating with their respective core sections such that flux generated in the respective core sections in response to current flow through said winding portions would be additive in the absence of said sensing member; the presence of said common sensing member diverting flux flow in said core sections such that flux flowing in each of said core sections flows in opposite directions through said sensing member.

7. The transducer of claim 6, wherein said first and second core sections are integrally joined to one another.

8. The transducer of claim 6, wherein said sensing member is constructed of high initial permeability ferromagnetic material, and wherein the material of said core sections and said sensing member is chosen of such high permeability that its reluctance is substantially negligible relative to the reluctance of the air gaps in said magnetic paths.

9. The transducer of claim 8, wherein the material of said core sections and sensing member is chosen so that the reluctance of each of said magnetic circuit paths plus the common sensing member is less than 2% of the reluctance of the respective air gaps such that for all practical purposes the reluctance of each of said magnetic circuit paths is dependent upon the lengths of the respective air gaps.

10. The transducer of claim 1, wherein said voltage source means includes first and second voltage sources of equal magnitude whereby with said sensing member in its null position such that the reluctance of each magnetic circuit path is equal; the net magnetic flux flowing through said sensing member will be zero while at the same time said first and second currents will be of equal magnitude.

11. The transducer of claim 10, wherein said circuit means includes a demodulating circuit for combining said first and second currents in subtracting relationship whereby when said first and second currents are equal said output current will be of zero magnitude.

12. The transducer of claim 10, wherein said first and second magnetic circuit paths comprise first and second core sections of ferromagnetic material having a predetermined cross-sectional area, and said sensing member is constructed of ferromagnetic material having a cross-sectional area significantly less than said core sections; the reduction in cross-sectional areas of said sensing member relative to said core sections being possible because of the zero net flux in said sensing member and the small forces of attraction between said sensing member and said core sections made possible thereby.

13. The transducer of claim 1, and further including auxiliary magnetic return path means connected between said sensing member and said first and second magnetic paths for returning differential flux which may be flowing through said sensing member to said first and second magnetic paths; whereby the magnitude of said differential flux may increase without magnetically saturating said sensing member.

14. The transducer of claim 13, wherein said first and second magnetic circuit paths comprise first and second core sections of ferromagnetic material and said auxiliary magnetic return path means comprise first and second auxiliary magnetic core sections connected between said sensing member and said first and second core sections.

15. The transducer of claim 14, wherein said first and second core sections include first and second pole faces facing one another and said sensing member comprises a corrugated diaphragm disposed intermediate said first and second pole faces.

16. The transducer of claim 15, wherein said corrugated diaphragm is sandwiched between first and second rings of ferromagnetic material and said rings are magnetically connected to said first and second core sections.

17. The transducer of claim 16, wherein said corrugated diaphragm is sandwiched between said rings within a chamber having ports disposed on opposite sides of said diaphragm.

18. The transducer of claim 16, wherein said ring members are connected to said first and second core sections and said first and second auxiliary core sections by means of integrally formed, inwardly directed flanges of the respective core sections through which are threaded into engagement with said rings supporting means of ferromagnetic material.

19. The transducer of claim 16, wherein said ring members are connected to said first and second core sections and said first and second auxiliary core sections by means of generally L-shaped members of ferromagnetic material having elongated slots in one portion thereof which abuts the respective core sections through which are passed fastening means of ferromagnetic material to removably secure said L-shaped sections to the respective core sections.

References Cited

UNITED STATES PATENTS

| | | | |
|---|---|---|---|
| 2,421,420 | 6/1947 | Hathaway | 340—199 XR |
| 2,539,833 | 1/1951 | Hathaway | 73—398 |
| 2,631,272 | 3/1953 | Smith | 340—199 XR |
| 2,759,356 | 8/1956 | Blackmon et al. | 73—88.5 |

RICHARD C. QUEISSER, *Primary Examiner.*

C. A. RUEHL, *Assistant Examiner.*

U.S. Cl. X.R.

336—30